Nov. 19, 1940.     G. W. ELSEY     2,222,195
FOIL FILMING MACHINE
Filed May 14, 1936     7 Sheets-Sheet 1

INVENTOR
George W. Elsey
BY
Spencer, Hardman & Fehr
his ATTORNEYS

Nov. 19, 1940.    G. W. ELSEY    2,222,195
FOIL FILMING MACHINE
Filed May 14, 1936    7 Sheets-Sheet 3

Nov. 19, 1940.  G. W. ELSEY  2,222,195
FOIL FILMING MACHINE
Filed May 14, 1936  7 Sheets-Sheet 6
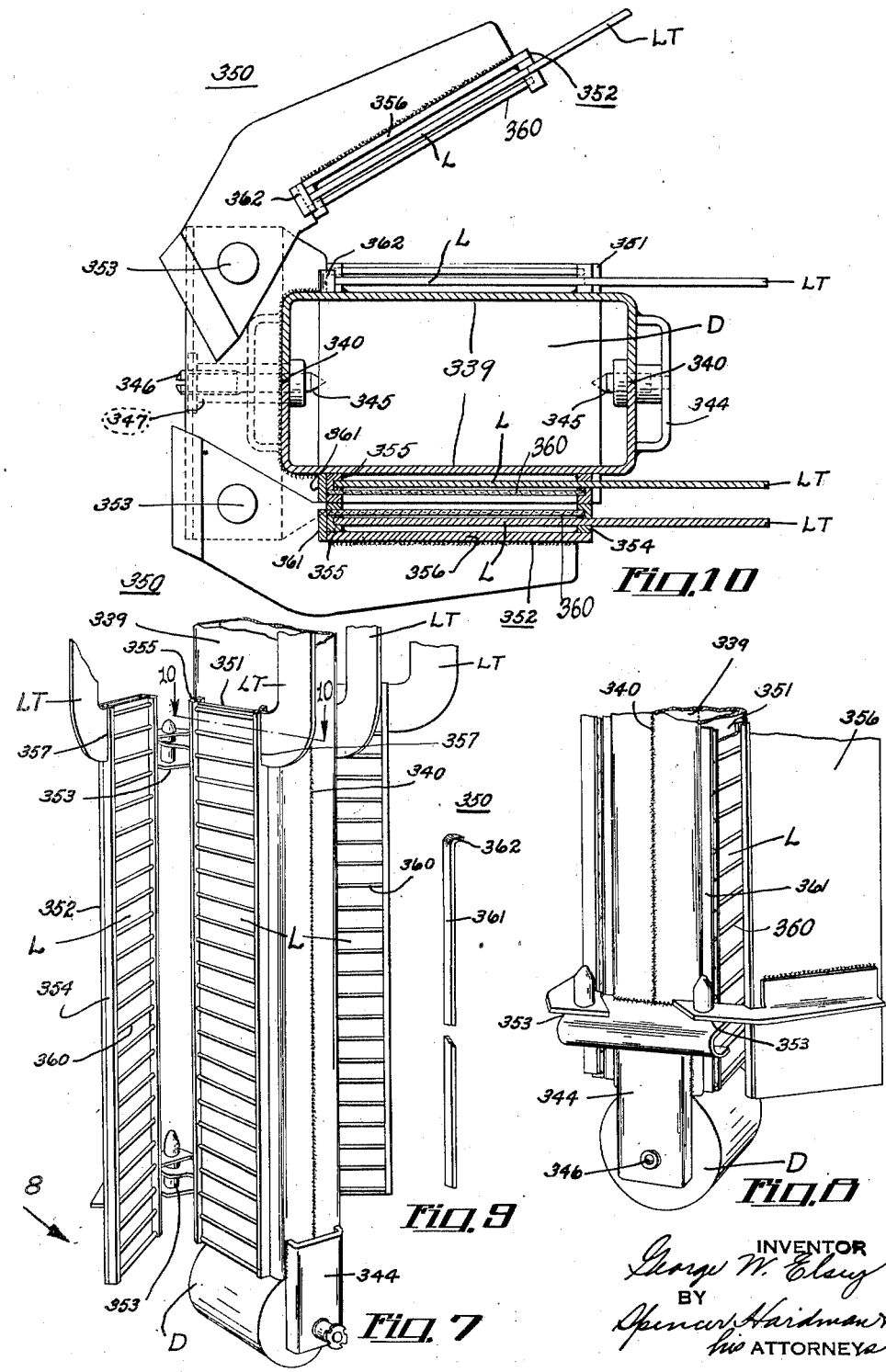

Nov. 19, 1940.   G. W. ELSEY   2,222,195
FOIL FILMING MACHINE
Filed May 14, 1936   7 Sheets-Sheet 7

INVENTOR
George W. Elsey
BY
Spencer Hardman & Fehr
his ATTORNEYS

Patented Nov. 19, 1940

2,222,195

UNITED STATES PATENT OFFICE 2,222,195

FOIL FILMING MACHINE

George W. Elsey, Dayton, Ohio, assignor to General Motors Corporation, Detroit, Mich., a corporation of Delaware Application May 14, 1936, Serial No. 79,805

5 Claims. (Cl. 204—5)

This invention relates to an apparatus for forming a dielectric film upon a metal foil for the purpose of making elements suitable for electrolytic condensers or similar apparatus using filmed electrodes. In the formation of dielectric film such as aluminum foil, the foil is passed through a filming bath containing a suitable electrolyte. An electric current is passed through this bath between the film as the anode and a suitable cathode.

The chief aim and object of the present invention is to form upon the film forming metal foil a dielectric film which will have a high degree of uniformity with respect to its operation in electrolytic devices, and to reduce the time required to form such a film thereby reducing the cost of manufacture of apparatus using filmed electrodes.

In view to accomplishing these general objects, the present invention provides means for maintaining the electrolytic filming bath as uniform as possible with respect to its temperature and consistency. The temperature of the bath is regulated within proper limits, preferably around 180° F., and is constantly maintained in circulation so that the bath will be uniform at the variout levels of the filming tank. Means are provided for rapidly dissipating excessive heat from the electrolyte so as to maintain its temperature within limits safe for the use of current required for the rapid filming of the foil. Care is taken to maintain the tension on the film as low and as uniform as possible as it is unrolled from the supply roll, passed through the filming tank and wound up on the take-up roll. The spindles carrying the supply roll, the take-up roll of film and the feed rolls and the guide rolls are all provided with anti-friction bearings of generous dimensions, and these bearings are lubricated by forced feed lubrication which constantly circulates lubricating oil to and from these bearings. The bearing cavities are kept filled with oil so as to prevent fumes from the electrolyte contacting with the bearings and causing them to corrode. These features enable the apparatus to operate very smoothly and uniformly, the friction to be overcome while the spindles and rolls revolve at a certain rate of speed being uniform to a high degree. By the use of such apparatus the foil may be fed at a relatively high rate of speed through the filming bath without danger of tearing the foil.

A further object of the invention is to facilitate the threading of the film around the guide rolls, between the feed rolls of the machine and between the guides which hold the film uniformly spaced with respect to the electrodes.

A still further object is to provide for the facile removal and replacement of electrodes.

A further object is to provide for a stopping of the machine automatically in case the film breaks.

A further object is to provide for easy splicing of the film from the machine.

A further object is to provide for the alignment of the foil take-up spindle with the foil as it passes from the feed rolls.

Further objects and advantages of the present invention will be apparent from the following description, reference being had to the accompanying drawings wherein a preferred embodiment of the present invention is clearly shown.

Fig. 7 is a perspective view of the device for guiding the film as it passes through the filming tank.

Fig. 8 is a fragmentary perspective view taken in the direction of the arrow 8 of Fig. 7.

Fig. 9 is a perspective view of part 361.

Fig. 10 is a sectional view thereof taken on line 10—10 of Fig. 7.

Figure 2:
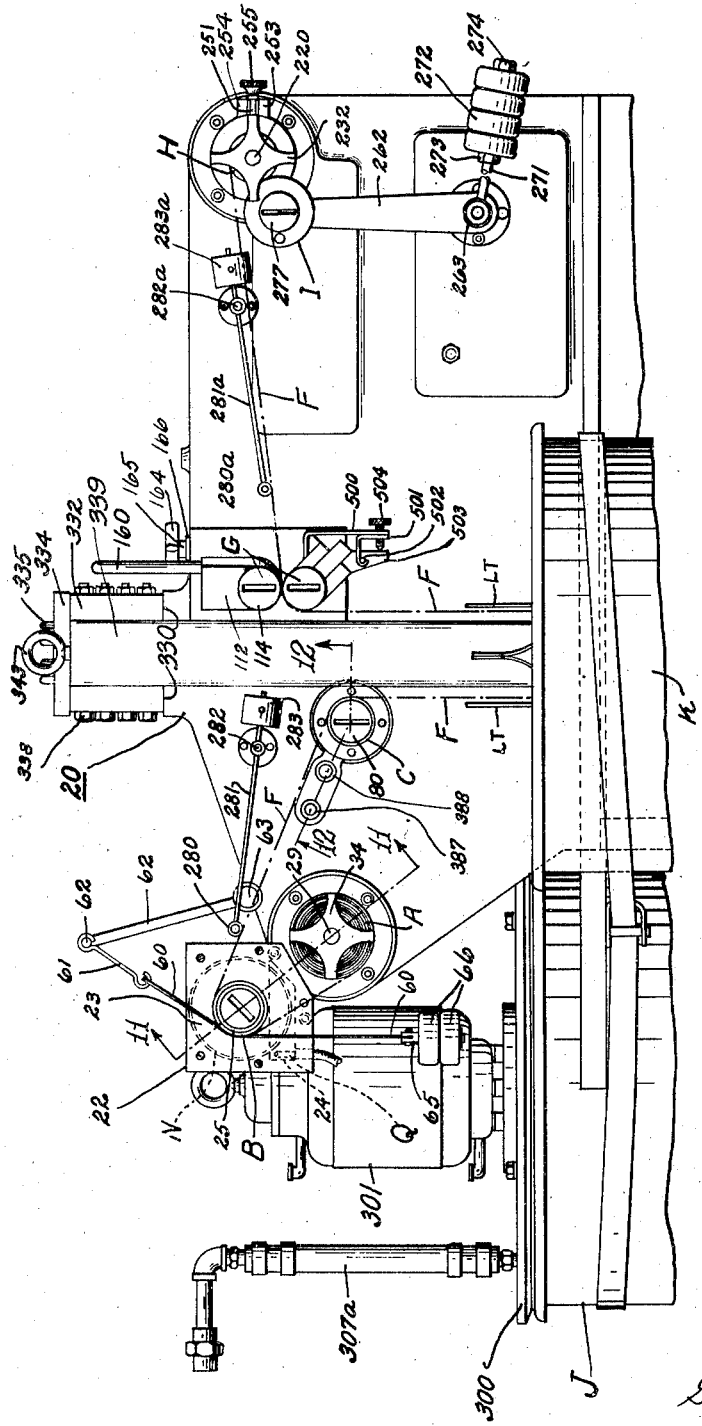
Fig. 2 is a fragmentary side elevation of the machine.
Figure 11:
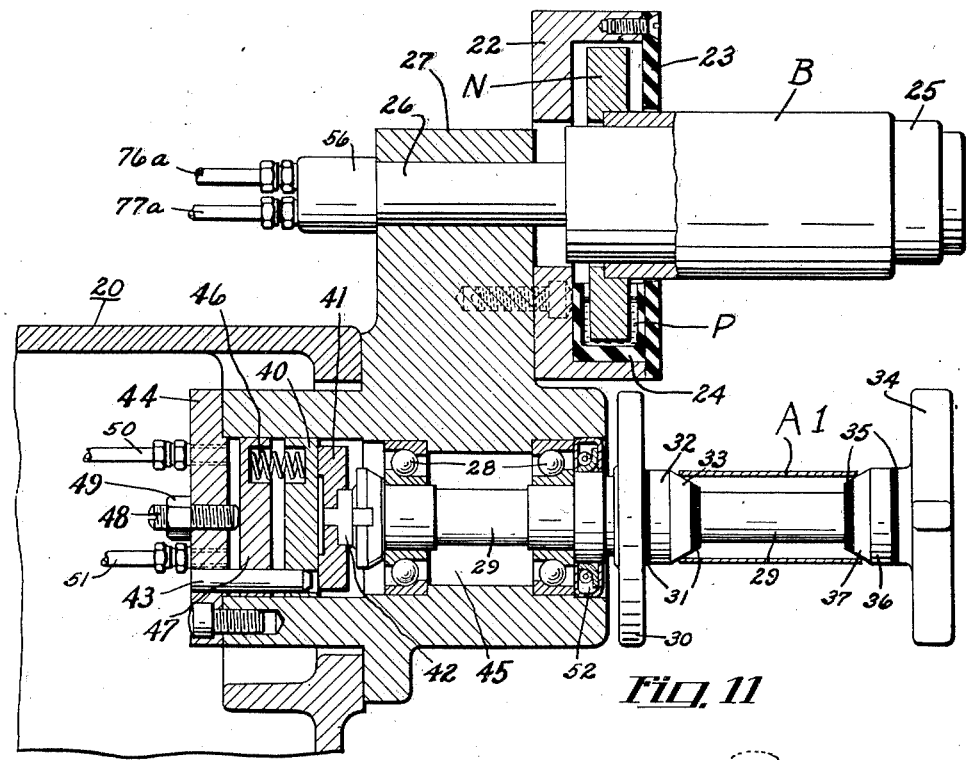
Figure 12:
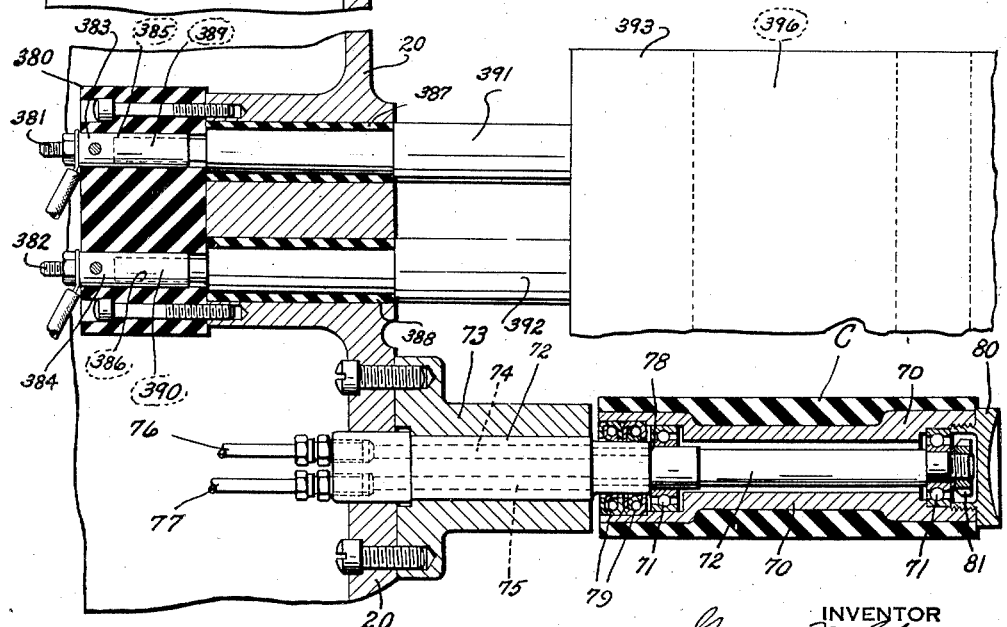

Figs. 11 and 12 are sectional views taken respectively on lines 11—11 and 12—12 of Fig. 2.

Figure 1:
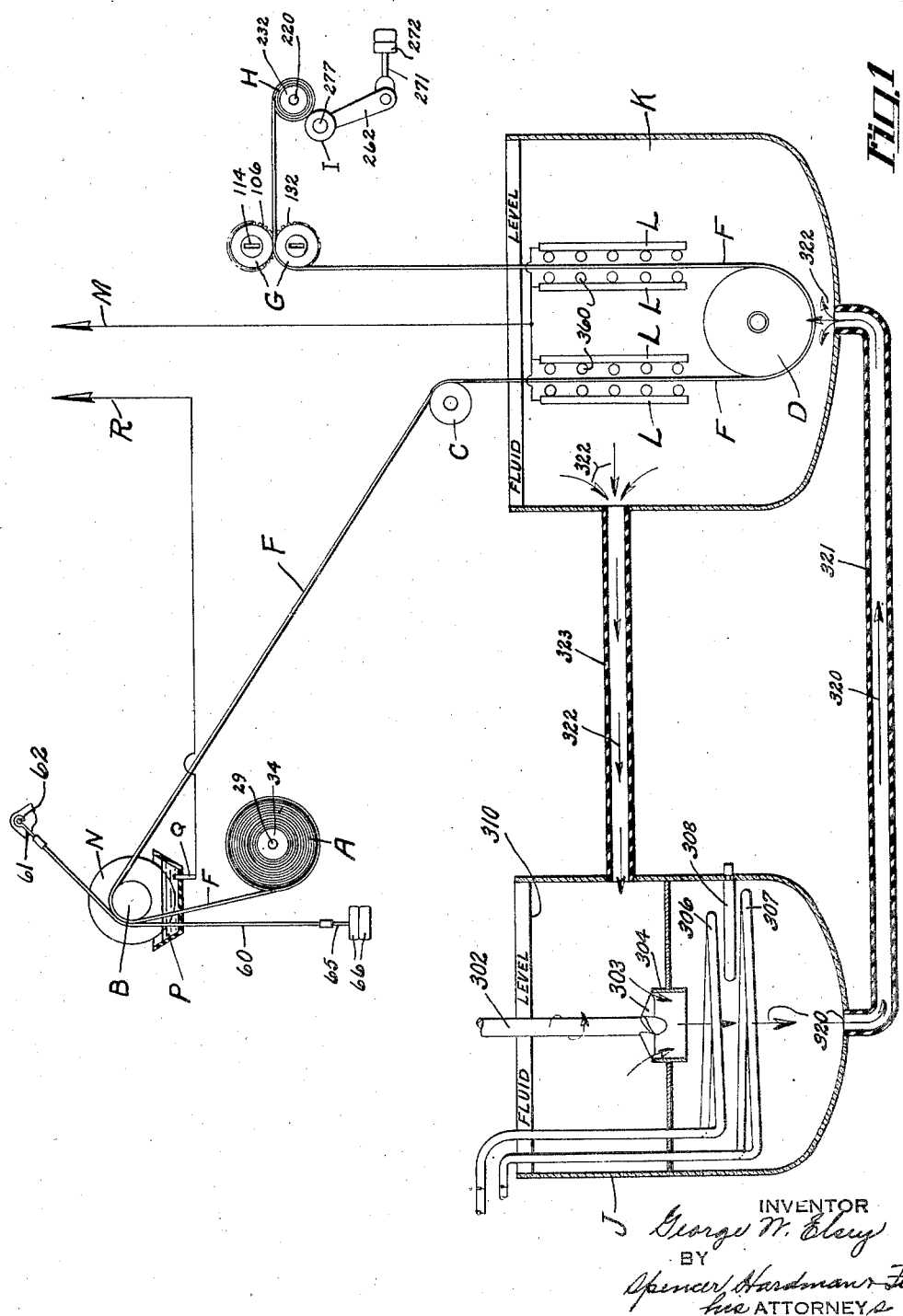
Fig. 1 is a diagram of a filming machine.

Referring to the diagrammatic illustration of the machine shown in Fig. 1, the supply roll of foil to be filmed is designated by A. The reel A is rotatably supported. The foil strip, designated by F, passes around a rotatably supported cylinder or drum B, then around a roller C, then vertically downward and around the roller D, then upwardly and horizontally between feed rolls G and then upon a spindle 220, upon which the roll H of filmed foil is wound. The rolls G are power driven so that the film will be pulled from the supply roll A around the various guiding rollers B and D. The foil F passes from the feed roll G to the take-up spindle 220, which is power driven at variable speed so that the film passing between the rolls G will be wound up tightly upon the take-up roll H.

J is the agitating tank in which the electrolyte for filming the foil is maintained at the desired temperature and from which the electrolyte is circulated to the filming tank K, within which the vertical portions of the foil F are located. These vertical portions pass between pairs of electrodes L connected to a common lead wire M. The electrolytic circuit within the tank K is completed through the foil itself. The roller B over which the foil passes is metallic and is in electrical connection with a metallic flange N, the lower edge of which is immersed in a bath of mercury P into which an electrode Q is connected with lead wire R. The film is caused to pass through the filming tank K at a predetermined uniform speed, preferably 36 feet per minute. The foil is maintained at all times at a predetermined distance from the electrodes L. The electrolyte within the tank K is maintained at a definite temperature and at a definite chemical analysis and is also constantly stirred to maintain it as a homogeneous mixture or solution. In this way a film having great uniformity is deposited on the foil.

Figure 3:
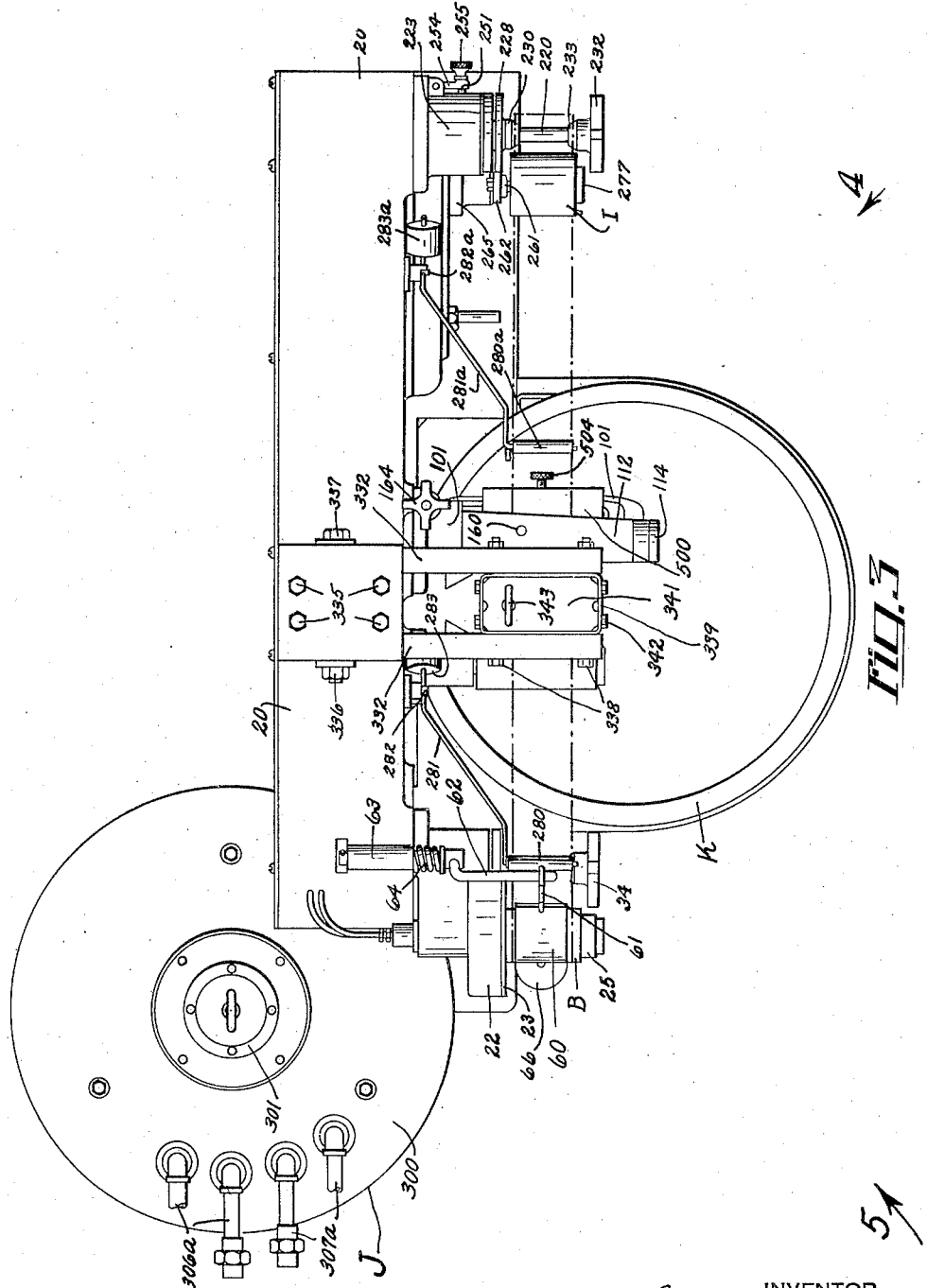
Fig. 3 is a top plan view.

The machine which has been described diagrammatically will now be described structurally with reference to Figs. 2 to 4 inclusive. The mechanism is supported by a frame 20 resting upon a base or pedestal 21. The frame 20, at its left hand end, carries bracket 22 which is in the form of a box having its side closed by a non-conducting plate 23. In the space between the plate 23 and a side wall of the bracket 22 there is located a non-conducting vessel 24 for containing the mercury bath P into which the electrode Q extends. The space within the bracket 22 also receives the conducting flange N which is silver soldered to the metallic roller B, which in turn is supported by non-conducting, preferably rubber roller 25 which is rotatably supported by antifriction bearings to be described on a stub shaft 26 carried by a bracket 27 attached to the frame 20. The friction produced by the flange N passing through the mercury bath P is relatively slight.

The bracket 27 carries ball bearings 28 rotatably supporting a shaft 29 carrying a fixed flange 30 of non-conducting material such as hard rubber. The flange 30 has a hub 31 which insulates the flange 30 from the shaft 29. The hub 31 is covered by a metal ring 32 having a conical surface 33 for engaging one end of the core A1 which supports the supply reel A of unfilmed foil. 34 is a nut which screw threadedly engages the right hand end of the shaft 29. The nut 34 has a hub which is surrounded by insulation 35 which in turn supports a metal ring 36 having a conical surface 37 for engaging the other end of the supply roll A. A light friction drag or braking action is placed upon the shaft 29 by means of friction discs 40 and 41, the former being stationary and the latter being connected to the shaft by a coupling 42. The disc 40 is prevented from rotating by a pin 43 attached to a cover plate 44 in the recess 45 within which the shaft 29 is located. Pressure is applied to the disc 40 by one or more springs 46 located between the disc 40 and an adjusting disc 47 which is guided by the pin 43 and also held from rotating. The disc 47 may be moved toward the disc 40 by a screw 48 held in adjusted position by lock nut 49. When the screw 48 is loosened the spring 46 will move the disc 47 from the disc 40. Plate 44 is provided with openings for receiving connections with a lubricating oil supply line 50 and a return line 51 so that the chamber 45 may be supplied with oil. The leakage of oil is prevented by the packing 52.

In order that the foil F will be maintained in good electrical contact with the conducting roll B a strap 60 of soft leather or other suitable material is held in engagement with a portion of the foil F which goes around roll B. This strap 60 is held by hook 61 secured by a bracket 62 which is pivotally attached at 63 to the frame 20. Counter clockwise rotation of the bracket 62 is resisted by coil spring 64 shown in Fig. 4. The lower end of the strap 60 is connected to a rod 65 carrying one or more weights 66. The mass of the weights 66 should be such as to cause the foil F to bear against the roll B with pressure sufficient for good electrical engagement but not to produce excessive friction upon the foil. When threading the foil upon the machine, the arm 62 is turned counterclockwise as viewed in Figs. 2 and 4 so that the strap 60 will hang free of the roll B.

Roller C is shown in detail in Fig. 12. Roller C is of non-conducting material, preferably rubber, and is mounted upon a metal sleeve 70 journalled by ball bearings 71 upon a stub shaft 72 carried by bracket 73 attached to the frame 20. The shaft is provided with passages 74 and 75 for the inlet and outlet of lubricant circulated through pipes 76 and 77 attached by suitable couplings to the shaft 72. The oil flowing in through the passage 74 comes out along the shoulder 78 and likewise oil returns to the outlet passage 75 along the shoulder 78. In this way the bearings 71 are provided with lubrication. Leakage is prevented by packing members 79 and a cap 80 which threadedly engage the right hand end of the sleeve 70. Cover cap 80 covers a nut 81 by which the parts are held in assembled relation upon the shaft 72.

The roller B is rotatably supported upon its stub shaft 56 by bearings similar to those provided for roller C, and the bearings for roller B are lubricated in identical manner, pipes 76a and 77a being provided for inlet and outlet of lubricant.

The feed rollers G are made of soft rubber and are vulcanized to metal sleeves similar to roller C which is shown in longitudinal section in Fig. 12. The sleeves have bearings carried by a frame 98 having a hub journaled in a bearing sleeve 100 carried by the frame 101. The frame 98 includes a yoke portion 112 which joins the hub at one end while the opposite end of the bracket 98 carries a cap 114 for closing the recess which receives the bearing. The lower roller G is attached to a lower shaft in the same manner as the upper roller G is attached to its shaft, and is supported upon and secured in place and properly spaced in the same manner. Oil leaks are prevented by packing members located and secured in position in the same manner as packing members in roller C.

Figure 4:
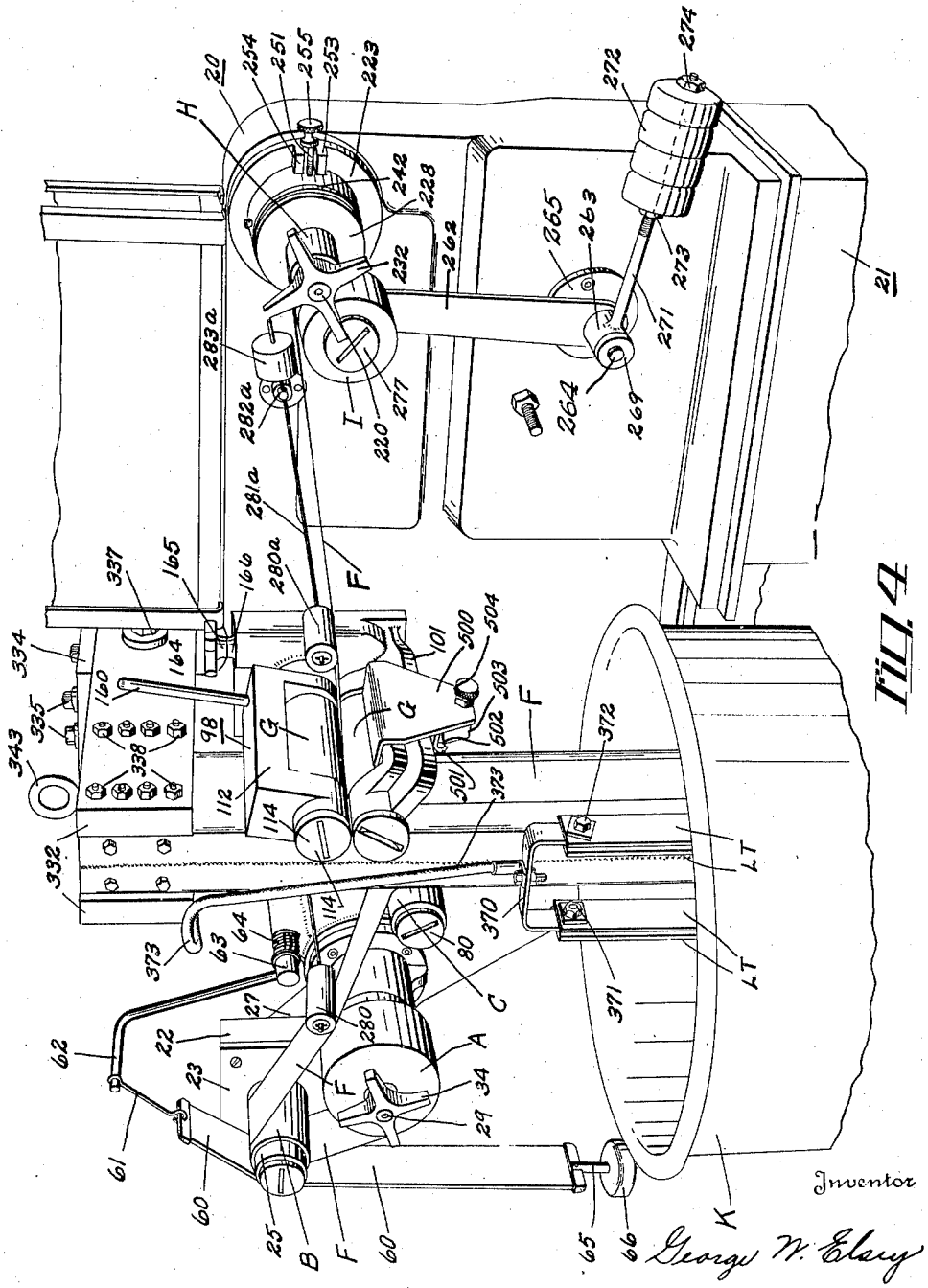
Fig. 4 is a perspective view of a portion of the machine looking in the general direction of arrow 4 of Fig. 3.

The bracket 98 may be turned upon its hub 99 in order to vary the distance between the upper roller G and the lower roller G as shown in Fig. 4, so that the foil strip may easily be entered between the rollers or for any other reason. The bracket 98 is turned by a handle 160 attached to the yoke 112. The bracket 98 is secured in the desired position of adjustment by a clamp comprising a nut cooperating with a screw provided with a handle 164. The hub 165 of the handle 164 bears against a clamping sleeve 166. When the handle is turned so that its screw moves into the nut, the nut and the sleeve 166 will clamp the bracket 98 against turning.

Referring to Figs. 2 and 4, the electrolyte which clings to the foil F and would accumulate upon the lower feed roll G is removed by a scraper 500 carried by a bracket 501 pivotally supported by a pin 502 carried by a lug 503 on the bracket 101. The distance between the lower roll G and the edge of the scraper is adjusted by turning a screw 504 threaded through tapped holes in the scraper 500 and bracket 501 and bearing against lug 503.

Referring to Figure 2, the take-up spool H is rotatably supported by a shaft 220 journaled in bearings carried by a bracket 223 fastened to a frame 20. The bracket has a flange which supports a small electric motor having a shaft connected with the shaft 220. The shaft 220 carries a non-conducting disc 228 having a hub surrounded by a metal ring 230 having a conical surface. The outer end of the shaft 220 is threaded to receive a nut 232 the hub of which is surrounded by a metal ring 233 having a conical surface and insulated from the nut by a non-conducting bushing. It will be understood that the core of the take-up spool H is clamped between the conical surfaces and by screwing the nut 232 along the shaft 220.

The motor is a low torque series wound D. C. motor so constructed that it may be stalled for a considerable period without damage, while the current remains on. The motor tends to run at a speed which is greater than just necessary to keep the foil taut as it is being wound upon the take-up spool H regardless of the diameter of the foil that is wound upon the take-up spool H. The normal speed of the motor is about 215 R. P. M., but it may operate without injury with the speed considerably below this. It will be understood that the motor will turn faster when there is relatively a small amount of foil wound upon the take-up spool H and slower as the diameter of the foil wound thereon increases.

As the foil is being wound upon the take-up spool H it is engaged by a pressure roller I which tends to iron out any wrinkles which may be present in the foil and tends to pack the foil firmly upon the take-up spool H. The roller I is mounted on bearings, carried by a stub shaft 261, secured to a lever arm 262 having a hub 263 pivotally supported by a stub shaft 264 provided by a bracket 265 attached to the frame 20. The hub 263 is insulated from the shaft 264 by non-conducting sleeve or like devices, and the hub 263 is retained in place by washers 269 attached to the shaft 264. The hub 263 is connected with a lever or weight rod 271 supporting a plurality of weights 272 retained between nuts 273 and 274. The number of these weights and their positions upon the rod 271 are such as to cause the roller I to bear with substantial pressure upon the foil. The bearings of the roller I are lubricated by oil retained within a chamber, which is sealed at one end by a plug 277 screwed into the roller I.

That part of the foil between the rollers B and C is engaged by a non-conducting roller 280 carried by an arm 281 pivoted on a shaft 282 and counterbalanced by a weight 283, the weight being adjusted so that the roller 280 bears lightly upon the foil F. If that part of the foil F between rollers B and C breaks the roller 280 will drop, thereby rotating the shaft 282 counterclockwise as viewed in Figures 2 and 4. The shaft 282 carries a mercury switch which is opened by this movement of the shaft 282 all as is well known in the art. When this switch is open a circuit to the driving is interrupted causing said motor to stop. Hence the feed of the foil strip F is discontinued. Similarly, that part of the foil F between the rollers G and the take-up spool H is engaged by a non-conducting roller 280a which is supported in the same manner as the roller 280 and operates a mercury switch which in turn controls the motor 191 in the same manner.

The agitator tank J will now be described in connection with Figures 1, 2, 3, 5 and 6. The tank J is provided with a cover 300 which supports an electric motor 301, which drives a shaft 302 carrying, at its lower end an impeller 303 located in proximity to a sleeve 304 supported by partition 305 carried by the walls of the tank J. Below the partition 305 is located a steam coil 306 and a cold water coil 307. In proximity to the coil 306 and 307 a pyrometer 308 is located. This pyrometer controls devices, not shown, for regulating the admission of steam to the coil 306, or cold water to the coil 307, depending upon the temperature at which the contents of the tank J is to be kept.

In this tank J is placed the liquid electrolyte used or filming the foil F. The level of the electrolyte in the tank J is preferably at the line 310. The electrolyte comprises preferably 73 pounds of boric acid and two pounds of sodium borate to every 80 gallons of distilled water, and is maintained at a temperature just below the boiling point of water.

The cover 300 carries one or more rods 311 threadedly engaging other rods 312 to which certain turns of the coils 306 and 307 are clamped by plates 313 and 314 and screws 315. The rods 312 support the partition 305. Sleeves 316 surround the rods 311 and serve as spacers for locating the partition 305 a definite distance below the cover 300. 317 designates a sealing ring located between the flanges of the cover and tank. The weight of the motor maintains the lid 300 upon the tank.

The function of the impeller 303 is to agitate the electrolyte mixture in order to keep it in a homogeneous state and in order to maintain its circulation around the coils 306 and 307 and to force the electrolyte, as indicated generally by the arrows 320, through a pipe 321 connected with the bottom of the filming tank K to cause the electrolyte to rise in the tank K and flow as indicated by the arrows 322 out through a return pipe 323 through the upper part of the agitator tank J. In this way the temperature and the consistency of the electrolyte is maintained as uniform as possible. The level of the electrolyte in the filming tank K is the same as it is in the agitator tank J.

Figure 5:
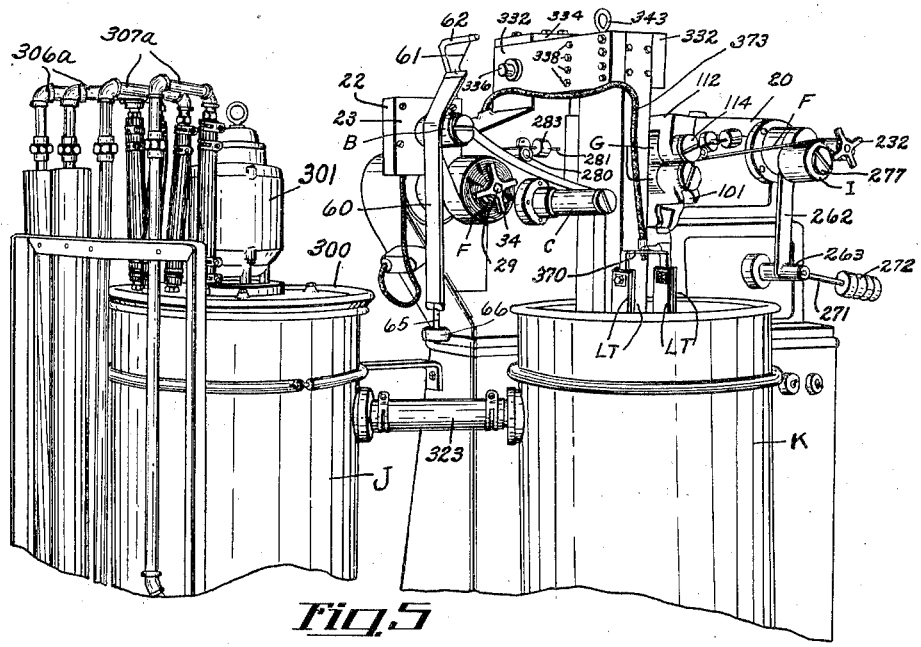
Fig. 5 is a perspective view taken in the direction of the arrow 5 of Fig. 3.
Figure 6:
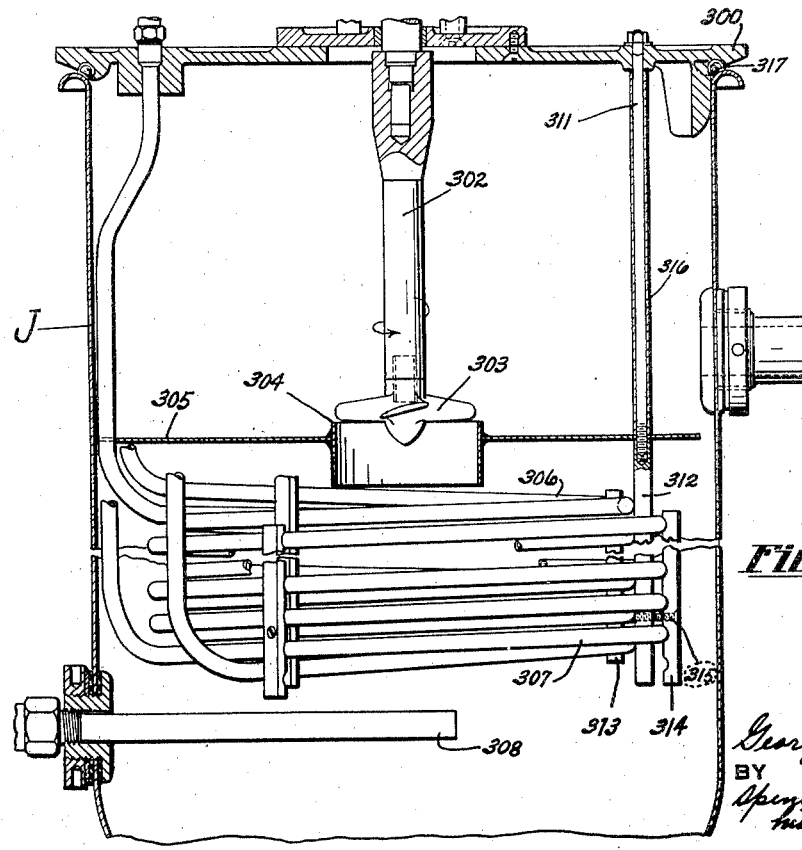
Fig. 6 is a vertical sectional view of the agitator tank.

Obviously the control of the temperature of the electrolyte and the agitation thereof could be effected in the tank K by increasing its size sufficiently to accommodate the apparatus shown in the tank J. In order to reduce corrosion, due to electrolysis, of metallic parts in contact with the electrolyte, it has been found advantageous to use an agitator and temperature control tank separate from the filming tank and to electrically insulate both tanks from each other and from ground as far as possible. In Figure 5, numerals 306a and 307a refer generally to the pipe connections connected respectively with the coils 306 and 307 in the tank J. The connections include rubber sections to electrically insulated tank J from ground. The pipes 321 and 323 are non-conducting, preferably rubber hose. Tanks J and K are supported on non-conducting blocks, not shown. The only electrical connection between the tanks J and K is through the electrolyte flowing in pipes 321 and 323, which connection is relatively high in resistance. By using two tanks electrically insulated from each other and from ground, the corrosive effects due to electrolysis are much less than in the case of the use of a single tank housing the entire equipment of the tanks J and K.

The means for supporting the electrodes L, which are made of a suitable corrosion resisting metal or alloy, will now be described. Referring to Figure 2, it will be seen that the frame 20 extends upwardly to provide two shelves 330 on each side of a pedestal. The shelves 330 each support electrically and thermally insulating beams 332, which are retained upon the shelves 330 by a plate 334 screwed to the pedestal by screw 335. Beams 332 are made with a steel core around which rubber is vulcanized. A bolt 336 extends through the beam 332 and cooperates with a nut 337 for clamping the beams 332 against the pedestal. Upon removal of the plate 334 and withdrawal of the bolt 336 the beams 332 and all the parts supported thereby may be removed without further disassembly. The beams 332 are secured by screws 338 to an electrode support 339 which is formed preferably of two strips of corrosion resisting metal, such as Monel, channel-shaped in cross section and welded together as indicated at 340 in Figure 10. A horizontal plate 341 is secured by screws 342 to the upper end of the electrode support 339, as shown in Figure 3. This plate carries an eye 343 by which the electrode support 339 may be hoisted out of the tank K after the beams 332 have been disconnected from the frame 20. The roller D, shown diagrammatically in Figure 1, is made of rubber and is pivotally supported at the lower end of the electrode support 339. For this purpose the support 339 is provided with brackets 344 which carry pin bearings 345, preferably made of "Stellite," one of which is adjustable by screw 346 received by bushing 347 attached to the adjacent bracket 344.

The electrode support 339 supports two pairs of electrode carriers 350 of corrosion resisting metal, such as Monel. The carriers of each pair 350 are designated 351 and 352. The carriers 351 are fastened directly to the support 339 and the carriers 352 are hinged at 353 to the carriers 351. The carriers are all channel-shaped in cross section and the flanges 354 of these channels are grooved at 355 to receive the side edges of the electrodes L which are supported by the grooves 355 in spaced relation to the web 356 of each channel-shaped carrier. Each electrode L has a terminal bar LT, which extends through a notch 357, in a flange 354, thus supporting the electrode L vertically. Each pair of flanges 354 of each electrode carrier supports a vertical row of horizontally arranged Pyrex rods 360 which are located in adjacent pairs, as shown in Figure 1, and serve to maintain the foil F at a fixed predetermined distance from the electrodes L. Pyrex is a preferred material for the rods 360 because it is non-conducting and retains its shape with change in temperature. These rods 360 offer very little resistance to the passage of the foil F between them. The flange 354 nearest hinge 353 is drilled through so these rods may be passed through this flange and the ends of these rods remote from the hinges all rest in holes partly drilled through the flange 354 which is remote from the hinges. The rods 360 are retained in this position by a vertically extending bar 361 of Monel metal which is retained on one side by the plates of the hinges 353. Each bar 361 has an ear 362 which rests upon the top of the adjacent channel flange 354. When the pairs of electrode carriers are separated, as shown in Figure 7, the foil to be filmed can be located between the electrodes and can be passed around the rubber roller D. Thus, the foil will have two vertical runs parallel to the electrode support 339. After threading the foil around the electrode support the pairs of carriers 350 are closed; that is, the hinged carriers 352 are closed upon the fixed carriers 351 and are held in this position.

The pairs of electrode terminals LT are secured to the ends of an inverted U-shaped strap 370 by means of bolts 371 and nuts 372. The strap 370 is attached, as shown in Fig. 4, to a lead 373 which corresponds to the lead M in the diagram, Fig. 1. The removal of the electrodes L is facilitated by this construction. The nuts 371 are unscrewed from the bolts 372 to permit the disconnection of this strap 370 which may then be moved out of the way since the conductor 373 is flexible. Then the operator grasps the electrodes L by their terminals LT and moves them upwardly from their respective electrode carriers. The electrodes L are removed from their carriers about once a week of five working days averaging 16 hours each for the purpose of cleaning the electrode surfaces. During a week's operation of the apparatus, precipitates from the electroylte gather on the surface of the electrodes L and increase the resistance to the flow of the filming current to such an extent as to interfere with the normal operation of the apparatus. After removal from the electrolyte, the electrodes L are cleaned by scrubbing with water.

A foil filming machine constructed in accordance with the drawings and specification has been used successfully to film aluminum foil as thin as .0004 inch in thickness and at a speed of 36 feet per minute. By controlling the temperature of the electrolyte and by maintaining its circulation, it is possible to use higher amperage of current than heretofore and thus accelerate the filming process. The handling of exceptionally thin foil has been made possible by the use of well lubricated, anti-friction bearings of generous proportions carried by a massive frame so designed that the warping thereof due to change in temperature is quite negligible. In so far as possible the frame is thermally insulated from the hot electrolyte. The water jacketing of the tank K helps to reduce heat transfer from the electrolyte to the frame. Wood blocks are used to support the tanks J and K upon a base (not shown) which also supports the frame. The electrode support is carried by the thermally non-conducting beams 332.

While the embodiment of the present invention as herein disclosed, constitutes a preferred form, it is to be understood that other forms might be adopted, all coming within the scope of the claims which follow.

What is claimed is as follows:

1. In an electrolyzing apparatus for filming traveling strips, the combination comprising, a cathode support adapted for suspension within a filming tank, means carried by opposite sides of the support and comprising spaced channel members adapted to support a cathode plate, a pair of frames hinged to the support and comprising channel members adapted to receive a cathode plate, each of said frames being normally disposed on opposite sides of the support and normally in closely spaced relation with the fixed channel members, and insulating rods carried by the channel members and extending across the face of the cathode plates and defining a passage through which the strip material may be passed in close proximity to the cathode plates but free from engagement therewith, and an idler roll situated at the end of the support for transposing the movement of the strip material from between one pair of cathode plates to movement between another pair of cathode plates.

2. In an electrolyzing apparatus for filming traveling strips, the combination comprising, a cathode support removably disposed within, but electrically insulated from a filming tank, means carried by the support and comprising spaced channel members adapted to support a cathode plate, a pair of frames removably secured to the support and each having channel members adapted to receive a cathode plate, each of said frames normally supporting a cathode plate in spaced parallel relation with a cathode plate carried by the support and forming a passage through which the traveling strip may move, insulators spaced longitudinally of the traveling strip and disposed between the traveling strip and each of the cathode plates and thus preventing contacting engagement between the contacting strip and either of the cathode plates.

3. In an electrolyzing apparatus for filming traveling strips, the combination comprising, a cathode support removably disposed within, but electrically insulated from a filming tank, means carried by the support and comprising spaced channel members adapted to support a cathode plate, a pair of frames adjacent the support and comprising channel members adapted to receive a cathode plate, each of said frames being normally disposed on opposite sides of the support and normally in closely spaced relation with the fixed channel members, and insulators carried by the channel members and extending across the face of the cathode plates for defining a passage through which the strip material may be passed in close proximity to the cathode plates, but free from engagement therewith, there being a pair of spaced cathode plates on opposite sides of the support, and means situated at the end of the support for transposing the movement of the strip material from between one pair of cathode plates to movement between another pair of cathode plates.

4. In a film-forming apparatus for foil strips, the combination of a tank for containing electrolyte, a post of rectangular section, means suspending the post vertically in the tank, a pair of cathode supporting members carried directly by the post, a pair of cathode supporting members hinged to the post, and means carried by the cathode supports for guiding the foil between the cathodes and for holding the foil at a fixed distance from the cathodes, a cathode support of each pair being disposed on opposite sides of the post, and parallel therewith.

5. In a film-forming apparatus for foil strips, in combination with a tank for containing electrolyte, a rectangular post member suspended vertically in the tank, two pairs of cathode supports, one support of each pair being attached directly to the post, means provided by said cathode supports for guiding the foil between the cathodes and at a fixed distance from the cathode, each pair of supports being arranged in parallelism on opposite sides of the post, and a roller supported at the end of the post for engaging that portion of the film between the pairs of cathode supports.

GEORGE W. ELSEY.